(No Model.) 3 Sheets—Sheet 3.
R. W. SHELBOURNE.
SAW MILL HEAD BLOCK.
No. 305,538. Patented Sept. 23, 1884.
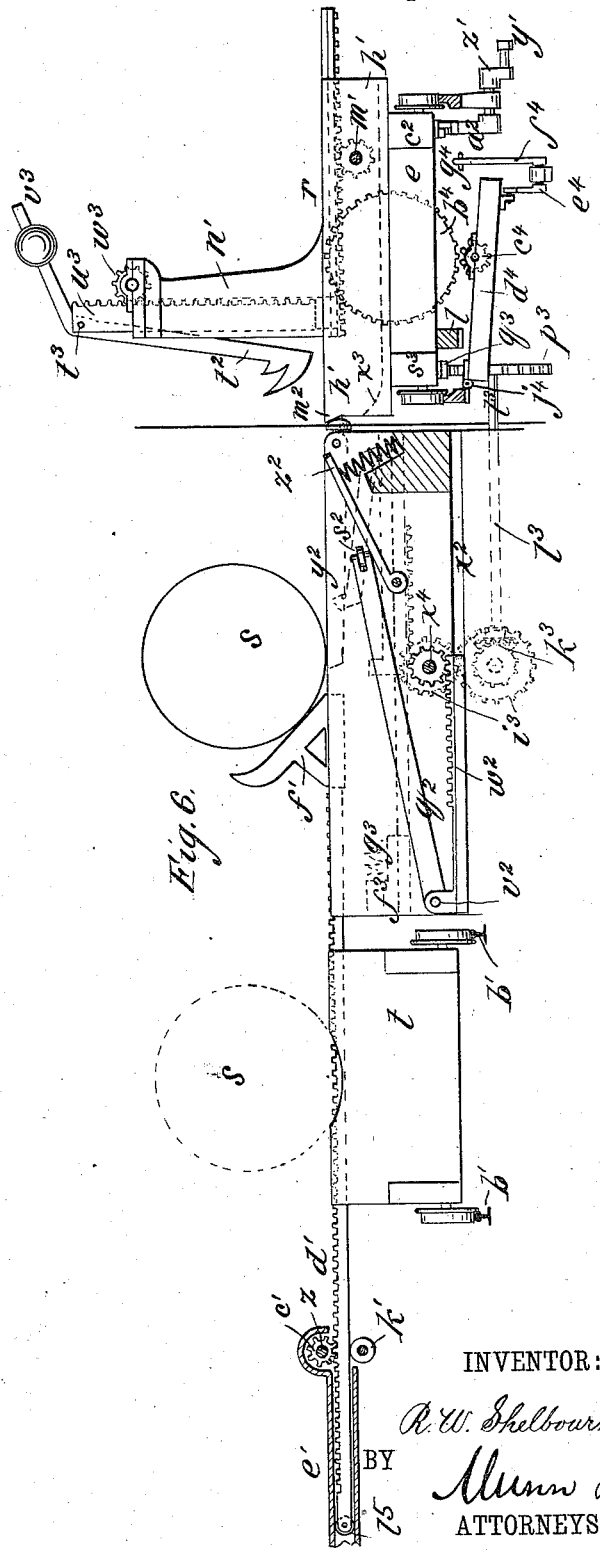
WITNESSES:
INVENTOR:
R. W. Shelbourne
BY Munn & Co
ATTORNEYS.

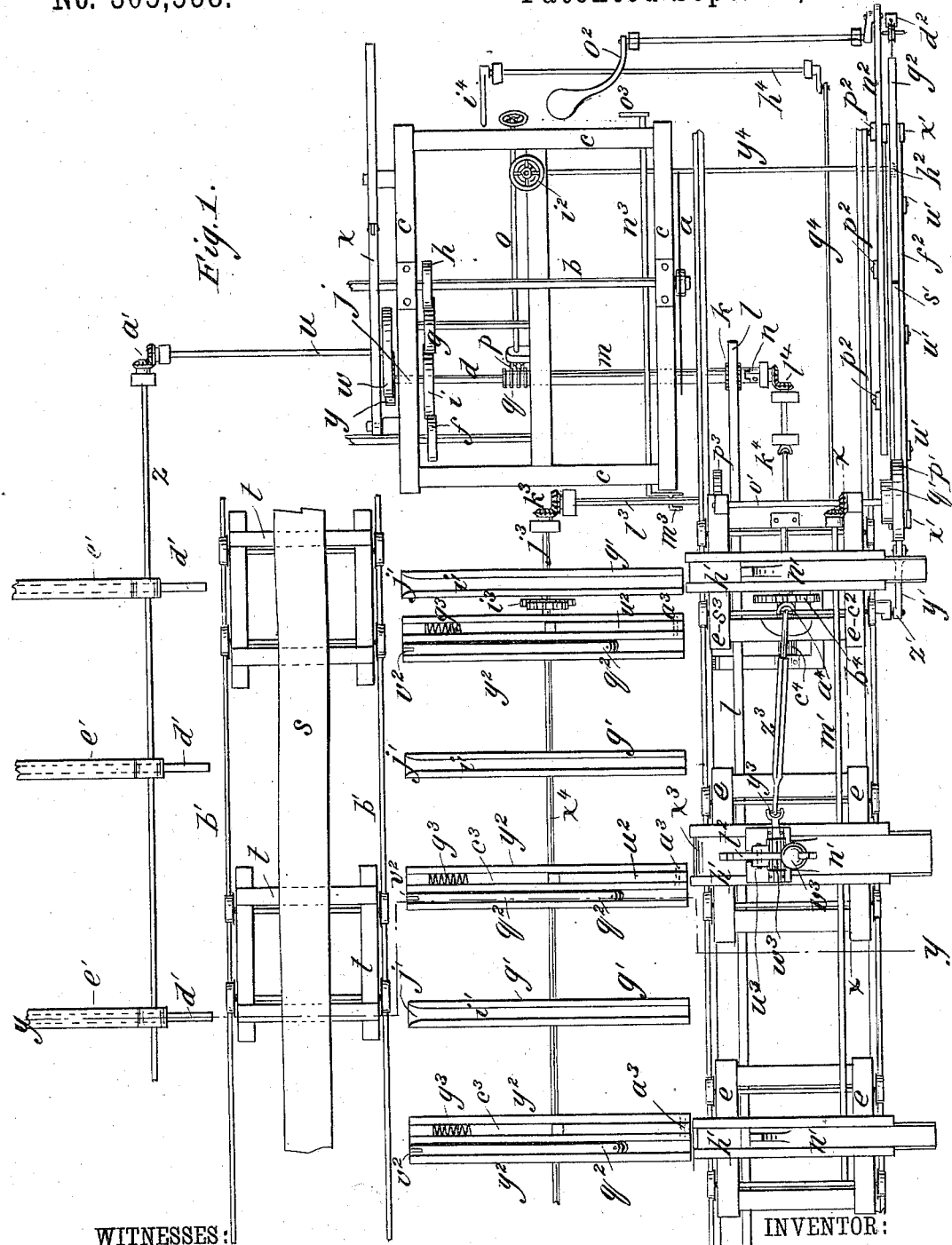

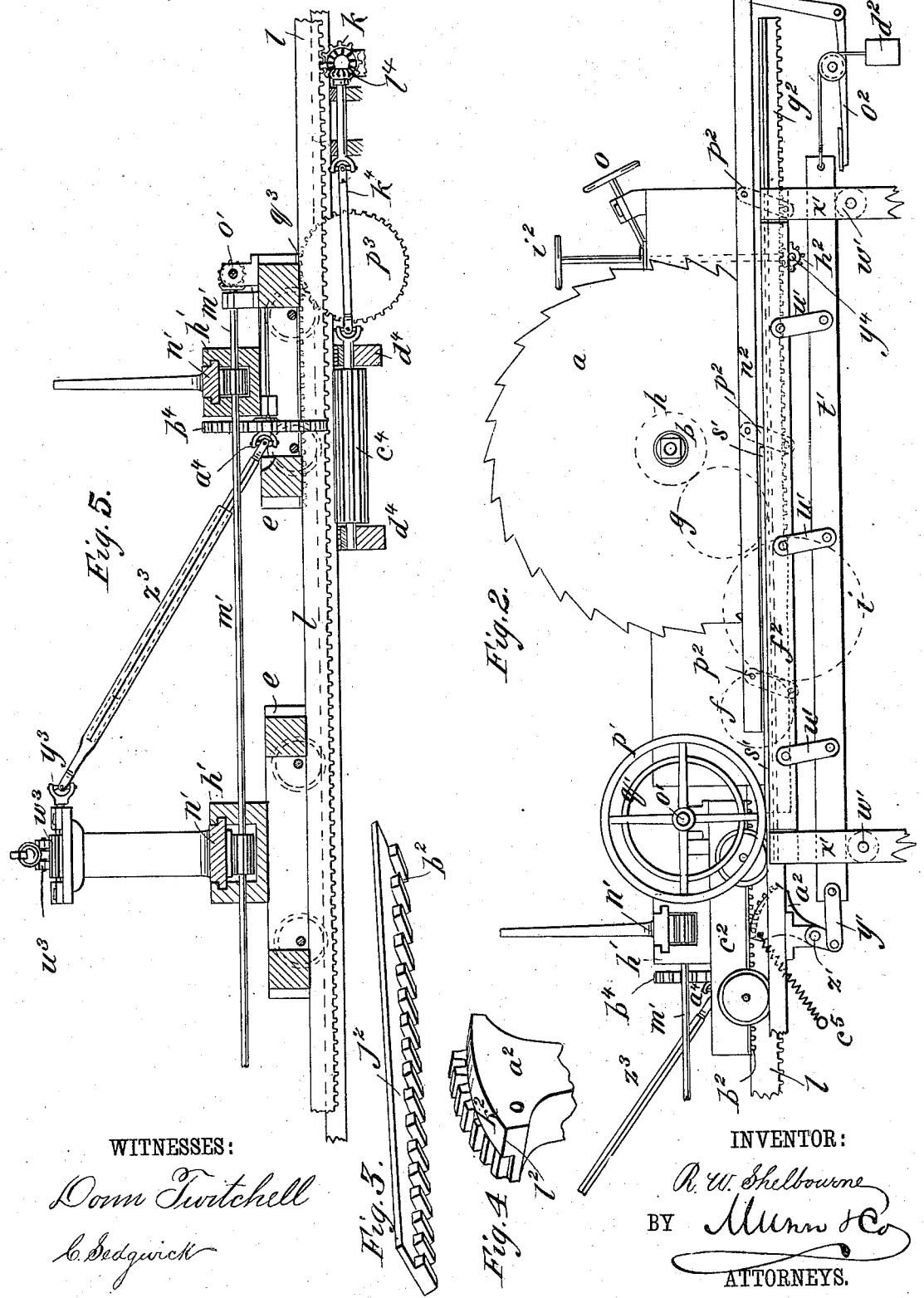

UNITED STATES PATENT OFFICE.

ROBISON W. SHELBOURNE, OF BLANDVILLE, KENTUCKY, ASSIGNOR, BY MESNE ASSIGNMENTS, TO WILLIAM OSCAR SHELBOURNE, MARY ANN SHELBOURNE, ROBERT E. LEE SHELBOURNE, BELLE BOYD SHELBOURNE, JOHN MOREAU SHELBOURNE, JOSEPH MARION SHELBOURNE, AND ALGERNON SIDNEY SHELBOURNE, ALL OF SAME PLACE.

SAW-MILL HEAD-BLOCK.

SPECIFICATION forming part of Letters Patent No. 305,538, dated September 23, 1884.

Application filed June 7, 1883. (No model.)

*To all whom it may concern:*

Be it known that I, ROBISON W. SHELBOURNE, of Blandville, in the county of Ballard and State of Kentucky, have invented certain new and useful Improvements in Saw-Mills, of which the following is a full, clear, and exact description.

This invention pertains to improvements in head-blocks for saw-mills, having for its object to effect the manipulation of the log in presenting it to the saw; and it consists of the several hereinafter described and claimed combinations and arrangements of parts.

Reference is to be had to the accompanying drawings, forming part of this specification, in which similar letters of reference indicate corresponding parts in all the figures.

Figure 1 is a plan view of a saw-mill with apparatus arranged according to my invention, for the purposes above specified. Fig. 2 is a side elevation of the saw and its gear and part of the log-carriage. Figs. 3 and 4 are details of the apparatus for setting the log up to the saw. Fig. 5 is a longitudinal section of the log-carriage with head-blocks on line $x$ $x$ of Fig. 1, and Fig. 6 is a transverse section on line $y$ $y$ of Fig. 1.

The saw $a$ is arranged on the mandrel $b$, having bearings in the saw-frame $c$, and is to be driven by a belt from the engine and running on a pulley, to be applied to the mandrel as commonly arranged. Motion is communicated to the shaft $d$, that feeds up and draws back the log-carriage $e$, by the friction-wheel $f$ for feeding and the wheel $g$ for running back, the latter being geared directly with the mandrel $b$ by the friction-wheel $h$, and wheel $f$ being geared with said mandrel by a belt and pulleys, (not shown, but as commonly arranged,) and these two wheels $f$ and $g$ being constantly running, so that the shaft $d$ is turned forward or backward, according to which way the carriage $e$ is to run, by shifting wheel $i$ on shaft $d$ into contact with one or the other, $f$ or $g$, for which purpose the bearing of shaft $d$ at $j$ is in practice arranged to shift on the beam of frame $c$ by a lever to be worked by the sawyer. The shaft $d$ works the log-carriage $e$ by the pinion $k$ and rack $l$.

Thus far the apparatus is the same as in common use.

For working the shaft $m'$, by which the knees $n'$ of the head-blocks $h'$ are made to slide forward on the head-blocks to set the logs up to the saw, and for shifting them back preparatory to turning the log or to make room for a new log, I have geared said shaft with a short shaft, $o'$, crossing the carriage and carrying the wheel, consisting of two rims, $p'$ and $q'$. The rim $p'$ is for setting the log up to the saw by running for a short distance on the rail $s'$, so as to be turned by it in the first part of the feed-motion of the carriage, to set the log up before it reaches the saw. This rail $s'$ must be so arranged that when the log is set up to the saw its contact with the rim $p'$ will cease, and contact must not occur when the log runs back, and the period of contact must vary suitably for setting the log up more or less, according to the thickness of the material to be sawed. The rail is therefore made to rise and fall by the sliding bar $t'$ and links $u'$ in the following manner: The bar $t'$ rests on rollers $w'$ in the posts $x'$, and it is connected by link $y'$ with a rock-shaft, $z'$, on which there is a toothed segment, $a^2$, that gears with the rack $b^2$ on the beam $c^2$ of the head-block nearest the saw. When the rack $b^2$ comes in contact with segment $a^2$, which is then resting in a position to the left hand of that in which it is represented in Fig. 3, and turns to the position in which it is shown, said segment $a^2$ pulls bar $t'$ to the left and raises rail $s'$ high enough to produce sufficient pressure on wheel-rim $p'$ to cause it to turn and move the log forward as long as segment $a^2$ is held in the position represented by the rack $b^2$, which continues until the rack escapes from the segment, when the weight $d^2$ reverses the bar and allows the rail $s'$ to drop. The length of the rail $s'$ is to be sufficient to set for the thickest pieces to be sawed—say six inches—and for setting to that extent its position must be such that rim $p'$ will run the whole length on it before it drops, and for setting to any thickness less the rail must drop before the rim $p'$ runs to the end of it. For this purpose the rail $s'$ is placed in a grooved support, $f^2$, to which the links $u'$ are connected, and the rail is geared by a rack, $g^2$, with a pinion, $h^2$, on a shaft, $y^4$, with which the hand-wheel $i^2$ is connected, and the gearings are proportioned so that one turn of the hand-wheel will move the rail $s'$ its length, which length, as before stated, is sufficient to set the log up six inches. The wheel $i^2$ is therefore to be graduated on the basis of a six-inch set of the log to a full turn of the wheel, and a pointer is to be provided, whereby the rail may be set to any desired extent less than six inches, which is to be done by shifting the rail $s'$ to the right hand, so that rim $p'$ reaches it later in the traverse of the rack $b^2$ along the segment $a^2$, and thus traverses less of the length of the rail before the rail drops by the escape of the rack $b^2$ from segment $a^2$, and the consequent reverse movement of bar $t'$. The rail $s'$, being down when the log-carriage runs back, will not have any effect on the rim $p'$, and the rack $b^2$ runs back over the segment $a^2$, which is merely pressed against the rack by the spring $c^5$, that is employed to hold it up for engaging said rack when it goes forward. To prevent the thumping of the teeth of the segment against those of the rack after the segment has run out of gear with the rack, and before the escape of the segment on the forward or feeding movement of the carriage, and while the rail $s'$ is being held up by the segment, the rack $b^2$ is constructed with a plain face, $j^2$, and the segment $a^2$ has an eccentric face, $k^2$, which is a little thicker at the corner $l^2$ than the length of the teeth, to bear on face $j^2$ and keep the teeth apart.

The head-block knees $n'$ are now slid back a little in order that the log may be pushed back on the head-blocks, so that the corner on which the log turns may be set back of the ends of the head-blocks over which the log projects a little as it stands when the board has been cut off, and which would prevent it from turning properly; and to accomplish this I have provided a rail, $n^2$, to be raised under the rim $q'$ when the carriage runs back by the foot-lever $o^2$ and links $p^2$.

The pinion $w^3$, which operates the adjusting-rack $u^3$ of the cant-hook $t^3$, is geared by a universal joint, $y^3$, with a telescopic extension-shaft, $z^3$, which is coupled at its other end by a universal joint, $a^4$, with a wheel, $b^4$, mounted in the head-block at the head of the carriage, (the head-block to which the hook is attached being the next,) with which wheel $b^4$ a long pinion, $c^4$, is caused to gear when the cant-hook is to be worked by swinging up its supporting-frame $d^4$ by the crank $e^4$, from which an arm, $f^4$, and rod $g^4$ extend to the crank-shaft $h^4$, which is worked by the sawyer's lever $i^4$. The supporting-frame $d^4$ is hinged at $j^4$ to the carriage-rail, or any floor-timber or other support, to be raised and lowered for connecting the cant-hook gear with the driving-power in this manner. The extension-shaft $z^3$ is employed to allow the head-blocks to be shifted toward and from each other for short or long logs, and the pinion $c^4$, which is geared with the feed-shaft $b$ by the jointed shaft $k^4$ and the bevel-wheel $l^4$, is made long in order that wheel $b^4$ will gear with it for turning the log, although the carriage may vary at times as to the point when it stops, said wheel $b^4$ being on the carriage, and pinion $c^4$ being supported on the floor-timbers.

I hereby reserve the right to embody and make claim in a separate application or applications for the log-turning devices and any other devices shown and described but not claimed in this application.

Having thus described my invention, I claim as new and desire to secure by Letters Patent—

1. In a saw-mill head-block, the combination, with the head-block and the log-setting shaft, of the wheel with its shaft gearing with the log-setting shaft, the rising and falling rail adapted for contact with the wheel, and the endwise-movable bar linked to the said rail and to a segmental rack capable of engagement with and disengagement from the head-block, and of actuating the endwise-movable bar, said bar having automatic movement when released from the action of the segmental bar, substantially as and for the purpose set forth.

2. In a saw-mill head-block, the combination, with the log-carriage and the log-setting shaft, of the wheel with its shaft gearing with the log-setting shaft, the rising and falling rail adapted for contact with the wheel, and the endwise-movable weighted bar linked to the rail and to a segmental rack capable of engagement with and disengagement from the head-block, and of actuating the endwise-movable bar, the latter also being endwise movable and having a rack engaged by a pinion with its shaft under the control of the attendant, substantially as and for the purpose specified.

3. In a saw-mill head-block, the combination, with the log-carriage and the log-setting shaft, of the wheel having a greater and a lesser rim and with its shaft gearing with the aforesaid shaft, the rising and falling rail adapted for contact with the wheel, the endwise-movable weighted bar linked to the rail and to a segmental rack capable of engagement with and disengagement from the head-block and of actuating the endwise-movable bar, and the pivoted bar arranged in a plane above the rail, and adapted for contact with the lesser rim of the wheel while its greater rim is still in contact with the rail, substantially as and for the purpose set forth.

4. In a saw-mill head-block, the combination, with the log-carriage $e$, the log-setting shaft $m'$, and the head-block $c^2$, having the rack $b^2$, of the wheel $p'$, with its shaft $o'$ gearing with the log-setting shaft $m'$, the rail $t'$, suspended by links $u'\,u'$, and having a retracting-weight, $d^2$, at one end, and connected at its other end to the shaft $z'$, the setting-rail $s'$, and segmental rack $a^2$, substantially as and for the purpose set forth.

5. In a saw-mill head-block, the combination, with the log-carriage $e$, the log-setting shaft $m'$, and the head-block $c^2$, having the rack $b^2$ and the blank portion $j^2$, of the wheel $p'$, with its shaft $o'$ gearing with the log-setting shaft $m'$, the rail $t'$, suspended by links $u'\,u'$, and having a retracting-weight, $d^2$, and connected to the shaft $z'$, the setting-rail $s'$, the segmental rack $a^2$, having the blank portion $k^2$, thickened at $l^2$, and the spring $c^5$, substantially as and for the purpose set forth.

6. In a saw-mill head-block, the combination, with the log-carriage $e$, the log-setting shaft $m'$, and the head-block $c^2$, having a rack, $b^2$, of the wheel $p'$, with its shaft $o'$ gearing with the log-setting shaft $m'$, the link-suspended rail $k'$, having the retracting-weight $d^2$, and connected to the setting-rail $s'$, the segmental rack $a^2$, shaft $z'$, and the rack-bar $g^2$, secured to the rail $s'$, and engaged by the pinion $h^2$ of the shaft $y^4$, engaged by the hand-wheel shaft $i^2$, substantially as and for the purpose set forth.

7. In a saw-mill head-block, the combination, with the log-carriage $e$, log-setting-shaft $m'$, and the head-block $c^2$, provided with a rack, $b^2$, of the wheel having the greater rim $p'$ and lesser rim $q'$, and with its shaft $o'$ gearing with the log-setting shaft $m'$, the link-suspended rail $t'$, having the retracting-weight $d^2$, and connected to the setting-rail $s'$, the shaft $z'$, the segmental rack $a^2$, and the rail $n^2$, supported upon the links $b^2$, and having the treadle or foot-lever $o^2$, substantially as and for the purpose set forth.

8. In a saw-mill head-block, the combination, with the log-carriage $e$, log-setting shaft $m'$, and head-block $e^2$, provided with the rack $b^2$, of the wheel having the rims $p'\,q'$, and its shaft $o'$ gearing with the log-setting shaft $m'$, link-suspended rail $t'$, having the retracting-weight $d^2$, and connected to the setting-rail $s'$ and to the shaft $z'$ of the segmental rack $a^2$, spring $c^5$, connected to the segmental rack, said rail $s'$ having the rack $g^2$ engaged by the pinion $h^2$ on the shaft $y^4$, geared to the shaft $i^2$, and the rail $n^2$, mounted upon links $p^2$ above the plane of movement of the rail $s'$, and connected to the foot-lever or treadle $o^2$, substantially as and for the purpose set forth.

9. In a saw-mill head-block, the head-blocks mounted on the log-carriage, and one having a cant-hook with its adjusting-rack gearing into a pinion, in combination with a shaft coupled to the shaft of said pinion and to a gear-wheel mounted in one head-block and gearing into a pinion whose shaft is coupled by shafts and pinions with the driving-shaft, substantially as and for the purpose set forth.

ROBISON W. SHELBOURNE.

Witnesses:
M. T. SHELBOURNE,
L. C. RAY.